Patented Sept. 1, 1953

2,650,937

UNITED STATES PATENT OFFICE 2,650,937

SUBSTITUTED BENZALDEHYDE-THIOSEMI-
CARBAZONE

Leon Katz, Cincinnati, Ohio, assignor to Schenley
Industries, Inc., New York, N. Y., a corporation
of Delaware No Drawing. Application April 12, 1951,
Serial No. 220,714

1 Claim. (Cl. 260—552)

This invention relates, in a general sense, to novel organic chemical compounds and, in a more particular sense, it is concerned with benzalthiosemicarbazones having certain substituents at the ortho and para positions of the benzal nucleus.

The novel group of compounds of the present invention may be represented by the formula:

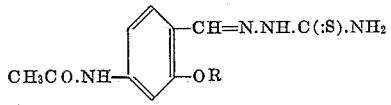

wherein R is an alkyl group chosen from the class consisting of ethyl, propyl, butyl and amyl; and simple mineral acid salts of such compounds.

It is now well known that certain para substituted benzalthiosemicarbazones, especially p-acetylamino-benzalthiosemicarbazone, are useful against pathogenic micro-organisms of the family Myco. tuberculosis. It is also known that alkylation of the sulfur or nitrogen atoms of these compounds does not enhance their activity, nor is a loss of activity caused by reduction of the carbon-nitrogen double bond.

It is now found that one of the members of a group of related substances, namely, the compounds of this invention, is not merely active against Myco. tuberculosis but, in vitro, shows even greater activity against certain strains of this organism than is shown by p-acetylamino-benzalthiosemicarbazone. The following table summarizes data based upon comparative studies in vitro of various of these new compounds and the norm or standard substance, p-acetylamino-benzalthiosemicarbazone. In the table, compounds having an activity superior to the norm are indicated by + and those of inferior activity by —.

| R | Comparative Activity at— | |
|---|---|---|
| | 48 hours | 72 hours |
| —$C_2H_5$ | — | — |
| —n-$C_3H_7$ | — | — |
| —n-$C_4H_9$ | — | — |
| —n-$C_5H_{11}$ | + | + |

The novel compounds of this invention can be synthesized by simple operations, using thiosemicarbazide and a suitably ortho substituted p-acetylamino-benzaldehyde, for example such compounds having, as the ortho substituent, an ethoxy, propoxy, butoxy or amyloxy group. The reaction between the thiosemicarbazide and the aldehyde can be performed in a boiling aqueous or any other suitable solvent medium, and the product, which separates from the solution upon cooling, forming a slurry, can be removed by filtration and washed with a lower alkanol.

Certain specific compounds and processes for making them will now be described to illustrate the principles of this invention and how these principles may be given concrete embodiment.

Example 1

Into a 1 liter three-necked flask, equipped with a sealed stirrer, reflux condenser and Glasool mantle are charged about 102 g. (0.66 mole) of 2-hydroxy-4-nitrotoluene, 30 g. (0.75 mole) of sodium hydroxide, and 400 ml. water. The mixture is stirred, heated to 100° C. and 0.75 mole of ethyl p-toluenesulfonate is added. After standing three to four hours at 100° C. the reaction mixture is chilled to 5° C., the resultant slurry is filtered, and the filter cake is washed with water until the drippings run almost colorless. The wet cake is recrystallized from 2–2.5 volumes of hot ethanol. Into a 1 liter three necked flask, fitted with a reflux condenser, are charged 45.3 g. (0.25 mole) of 2-ethoxy-4-nitrotoluene, prepared as above described, and 400 ml. 95% ethanol. While the mixture is heated to reflux, a solution of 60.0 g. (0.25 mole) of sodium sulfide nonahydrate and 8.0 g. (0.25 mole) of sulfur is prepared by heating the two components together, and this solution is added to the refluxing ethanol solution and the mixture is refluxed vigorously for five hours. The reaction mixture is then steam distilled to remove the solvent and some 2-ethoxy-p-toluidine (usually about three hours suffices). After chilling the mixture overnight, the supernatant liquid is decanted and the semi-solid mass is transferred to a 250 ml. beaker. Fifty milliliters of acetic anhydride are added and then 4–5 drops of sulfuric acid. Acetylation proceeds rapidly and a dark brown solution is obtained which is added to a boiling mixture of 300 ml. ethanol and 50 ml. water. The mixture is boiled 10–15 minutes to decompose excess acetic anhydride, then about 15.0 g. (0.155 mole) of thiosemicarbazide, dissolved in 100 ml. of boiling water, is added. A heavy yellow precipitate forms quickly. After heating for an additional one-quarter hour, the slurry is chilled for four to five hours, and the solid is then collected on a Büchner funnel and dried in vacuo at 60° C. The weight of the yellow material obtained, melting point 229° to 232° C., is about 31.5 g., equivalent to 45% of theory based on the weight of 2-ethoxy-4-nitrotoluene used. This product is 2-ethoxy-4-acetylamino-benzalthiosemicarbazone.

*Example 2*

By following the procedure of Example 1 but substituting a chemically equivalent quantity of propyl p-toluenesulfonate for the ethyl p-toluenesulfonate there employed, approximately 29.5% of the theoretical yield of the desired product is obtained, based upon the weight of the intermediate 2-propoxy-4-nitro-toluene used. This product is 2-propoxy-4-acetylamino-benzalthiosemicarbazone, having a melting point of about 229.5° C., following crystallization from aqueous isopropanol, and the empirical formula $C_{13}H_{18}O_2N_4S$, with a calculated nitrogen content of 19.03%, sulfur, 10.88%, and, found, nitrogen, 19.27%, and sulfur, 11.13%.

*Example 3*

By following the procedure of Example 1 but substituting a chemically equivalent quantity of butyl p-toluenesulfonate for the ethyl p-toluenesulfonate there employed, approximately 42.3% of the theoretical yield of the desired product is obtained, based upon the weight of the intermediate 2-butoxy-4-nitro-toluene used. This product is 2-butoxy-4-acetylamino-benzalthiosemicarbazone, having a melting point of about 216° C., following crystallization from aqueous isopropanol, and the empirical formula $$C_{14}H_{20}O_2N_4S$$

with a calculated nitrogen content of 18.18%, sulfur, 10.38%, and, found, nitrogen, 18.43%, and sulfur, 10.45%.

*Example 4*

By following the procedure of Example 1 but substituting a chemically equivalent quantity of amyl p-toluenesulfonate for the ethyl p-toluene sulfonate there employed, approximately 40.4% of the theoretical yield of the desired product is obtained, based upon the weight of the intermediate 2-amyloxy-4-nitro-toluene used. This product is 2-amyloxy-4-acetylamino-benzalthiosemicarbazone, having a melting point of about 174.5° C., following crystallization from methanol, and the empirical formula $C_{15}H_{22}O_2N_4S$, with a calculated nitrogen content of 17.38%, sulfur, 9.93%, and, found, nitrogen, 17.31% and sulfur, 10.01%.

It will be understood by those versed in the art to which this invention relates that the invention includes within its scope the simple mineral acid salts of the free bases above described, in which the acid is bound to the omega nitrogen of the thiosemicarbazone moiety, to produce a salt analogous to the mineral acid salts of amines. The salts may be produced by dissolving the free bases in a mineral acid solution, for example, mineral acids such as hydrochloric acid, nitric acid, sulfuric acid and the like. The term "mineral acid salts" in the claim is used in this sense and with this meaning.

Having thus described the subject matter of the present invention, what it is desired to secure by Letters Patent of the United States is:

Chemotherapeutic agents represented by the formula:

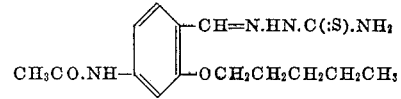

and simple mineral acid salts thereof.

LEON KATZ.

References Cited in the file of this patent

Domagk, "Naturwissenschaften," vol. 33, November 30, 1946, p. 315.

Behnisch et al., "Angewandte Chemie," vol. 60, May 1948, pp. 113 and 114.

Behnisch et al., "The American Review of Tuberculosis," vol. 61, January 1950, pp. 2, 3 and 4.

Bävin et al., "J. Pharm. Pharmacol," vol. 2, November 1950, pp. 764 to 772.